United States Patent [19]
Vogler et al.

[11] Patent Number: 4,623,001
[45] Date of Patent: Nov. 18, 1986

[54] ROTARY SLIDE VALVE

[75] Inventors: Helmut J. Vogler, Solingen, Fed. Rep. of Germany; Peter H. Janssen, Panningen, Netherlands

[73] Assignee: Kalvo-Vogler GmbH, Solingen, Fed. Rep. of Germany

[21] Appl. No.: 669,601

[22] Filed: Nov. 8, 1984

[30] Foreign Application Priority Data

Nov. 9, 1983 [DE] Fed. Rep. of Germany ....... 3340400

[51] Int. Cl.$^4$ .......................................... F16K 11/085
[52] U.S. Cl. .......................... 137/625.46; 137/625.43
[58] Field of Search ...................... 137/625.43, 625.22, 137/625.23, 625.24, 625.47, 625.46

[56] References Cited

U.S. PATENT DOCUMENTS

| 21,524 | 9/1958 | Stewart | 137/625.22 |
| 1,329,881 | 2/1920 | Bloom | 137/625.23 |
| 2,239,139 | 4/1941 | Allin | 137/625.22 |
| 3,973,592 | 8/1976 | Cleaver et al. | 137/625.43 |

FOREIGN PATENT DOCUMENTS

| 312210 | 5/1919 | Fed. Rep. of Germany | 137/625.43 |
| 3147511 | 6/1983 | Fed. Rep. of Germany | . |

Primary Examiner—Martin P. Schwadron
Assistant Examiner—John S. Starsiak, Jr.
Attorney, Agent, or Firm—Karl F. Ross; Herbert Dubno

[57] ABSTRACT

The invention relates to a rotary slide valve, the cylindrical valve member of which is mounted with its axis of rotation transverse to the flow and rests within a fixed coaxial cylinder of approximately the same size, of which the orifices allowing the flow medium to pass through are controlled by orifices and wall parts of the valve member. The valve member is surrounded coaxially by an outer cylinder which has a larger diameter and which possesses on each of its sides located opposite one another respectively an inlet and an outlet and first and second conduits, so that, in the normal position of the valve member, the inlet on the one side is connected to the second conduit on the other side and the outlet on the one side is connected to the first conduit on the other side and, in the deflected position, the inlet and first conduit are connected to one another and the outlet and second conduit are connected to one another. In the latter position, a first stream flows through a first inner chamber of the valve member, and a second stream flows through a pair of second inner chambers of the valve member, which flanks the first chamber in the axial direction and a partition wall formed in an axial plane in the first chamber. The valve member does not touch the outer cylinder, and in the rotary positions the streams flow through the inner spaces of the slide valve.

2 Claims, 7 Drawing Figures

ROTARY SLIDE VALVE

FIELD OF THE INVENTION

The invention relates to a rotary slide valve, the cylindrical movable valve member of which is mounted with its axis of rotation transverse to the flow and rests against a fixed coaxial cylinder of approximately the same size, of which the orifices allowing the flow medium to pass through are controlled by orifices and wall parts of the valve member, the valve member being surrounded coaxially by an outer fixed cylinder which has a larger diameter than the first-mentioned fixed cylinder and which possesses on opposite sides a an inlet and an outlet, so that, in a normal position of the slide valve, an inlet on the first side is connected to the outlet on the second side and the outlet on the first side is connected to the inlet on the second side, and, in an angularly displaced position, the inlets are connected to one another and the outlets are connected to one another, in the latter position the first stream flowing through a first inner chamber of the valve member and a second stream flowing through a second inner chamber of the valve member, which adjoins the former in the axial direction and of which the partition wall between the chambers extends in a direction approximately at a right angle to the axis of rotation of the slide valve.

BACKGROUND OF THE INVENTION

A rotary slide valve is known from German Offenlegungsschrift No. 3,147,511. In this known rotary slide valve, in the normal position of the valve member the forward and return streams flow through an annular space between the outer cylinder and the inner fixed cylinder, and in the position in which the streams intersect, one stream flows through the first chamber of the valve member and the second stream flows through a second chamber thereof. The valve member rests by means of radial wall parts against the inner wall of the outer cylinder, that is to say the valve member interacts with the outer cylinder, so that the outer cylinder has to be produced with high precision. Since the four connection fittings are fastened to the outer cylinder, shear and tensile forces are easily transmitted from the connection pieces to the outer cylinder, with the result that there is no guarantee that the device will function reliably. Wear between the rotary valve member and the inner wall of the outer cylinder as well as jamming and leakages can result. Also, in offset position, the rotary valve member is subjected to uneven stress towards a tilted position because of the streams of water flowing through the two chambers, so that wear, jamming and leakage can occur and the bearings can be subjected to a severe load.

OBJECT OF THE INVENTION

The object of the invention is to improve a rotary slide valve of the type mentioned in the field of the invention, in such a way that operating reliability and leak-tightness are increased and wear is reduced.

SUMMARY OF THE INVENTION

According to the invention, this object is achieved by so forming the valve member that it does not touch the outer cylinder, and in the two rotary positions the streams are caused to flow through the inner spaces of the valve member.

Because the rotary valve member no longer interacts with the outer cylinder, but only with the fixed inner cylinder, variations in the configuration of dimensions of the outer cylinder do not affect operating reliability, wear and leak-tightness. The outer cylinder can absorb the forces exerted by the connection pieces and need not transfer them inwards, so that the outer cylinder performs only a connecting and protection function, while the inner drum-shaped valve member interacts with a high degree of precision with the inner fixed cylinder and thereby achieves a high level of leak-tightness and is subjected to only slight wear.

It is particularly advantageous if the interior of the slide valve is divided in the axial direction into three chambers, of which a middle chamber conveys the first stream and the two outer chambers convey the second stream which is substantially equal to the first stream. As a result, it is possible to ensure that the rotary valve member is always subjected to a uniform load by the medium streams, especially by water streams.

Tilting about an axis perpendicular to the axis of rotation is avoided with a high degree of reliability, and consequently the bearings are subjected to less load. Also, this results in a further increase in leak-tightness and a reduction in the wear. In particular, in one position, especially the deflected or offset position, the flow medium flows through all three chambers, and in the other position, the normal position, the flow medium flows through the middle chamber only. Furthermore, at the same time, we may divide the middle chamber into two half chambers by means of a middle partition wall extending parallel to the axis of rotation or through the latter. It is preferred that, in the normal position, one half chamber should convey the first stream and the second half chamber the second stream, and that, in the deflected position, the two half chambers together can convey only one of the two first or second streams.

To obtain flow cross-sections of equal size for both streams in the deflected positions of the valve member, as measured in the axial direction, the middle chamber should have a greater axial length than either one of the two flanking outer chambers. Furthermore, in this respect, the outer chambers can have approximately the same axial length as one another, and the middle chamber can have approximately twice the axial length of either outer chamber.

To ensure than all the streams always flow only through the inner space of the valve member, it is proposed that the annular space between the valve member and the outer cylinder should have radial partition walls which prevent the medium through the annular space to flowing from the connections, in both positions of the valve member.

It is particularly advantageous that such a rotary slide-valve device can be used in the lines leading to a heat exchanger having in its (condenser) tubes freely movable brushes which are moveable to and fro with a reversal of the water stream and which consequently clean the tubes of the heat exchanger.

BRIEF DESCRIPTION OF THE DRAWING

An exemplary embodiment of the invention is illustrated in the drawing and described in more detail below. In the drawing.

SPECIFIC DESCRIPTION

Figure 1:
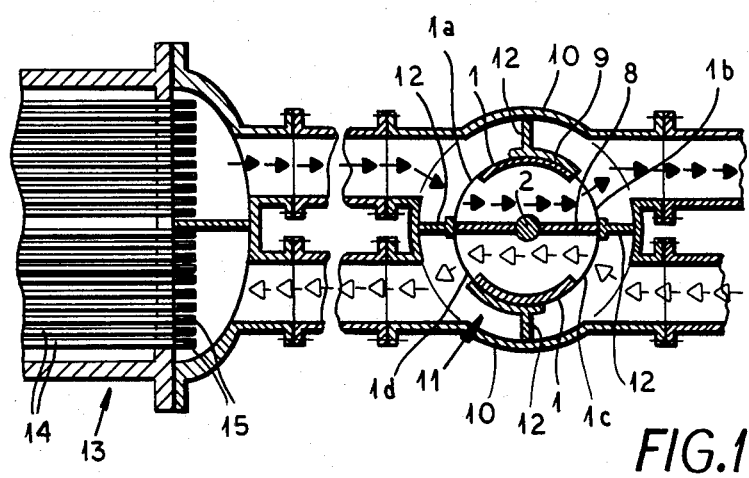
FIG. 1 is a horizontal section through the device in the normal position of the valve member connected to a heat exchanger.
Figure 2:
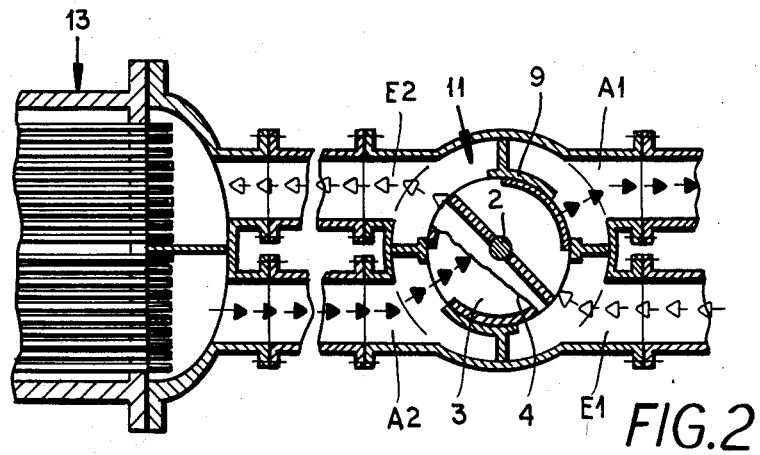
FIG. 2 is a section corresponding to FIG. 1 but with the valve member in the deflected or offset position
Figure 3:
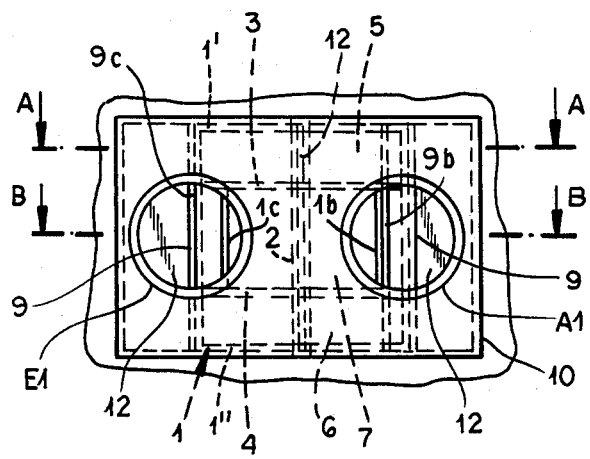
FIG. 3 is an end view of the device of FIG. 1

The device of the invention has a drum-shaped or cylindrical valve member 1 which is designed as a hollow cylinder and has an axis of rotation of which is at a right angle to. The cylindrical inner space of the valve member 1 is divided into three cylindrical chambers by two horizontal transverse walls 3, 4 arranged at right angles to the axis of rotation 2, the end faces of the valve member cylinder also being closed off by walls 1.1. The outer two chamber 5,6 have the same axial length, and the chamber 7 has twice the axial length of one of the other two chambers 5,6.

Figure 4:
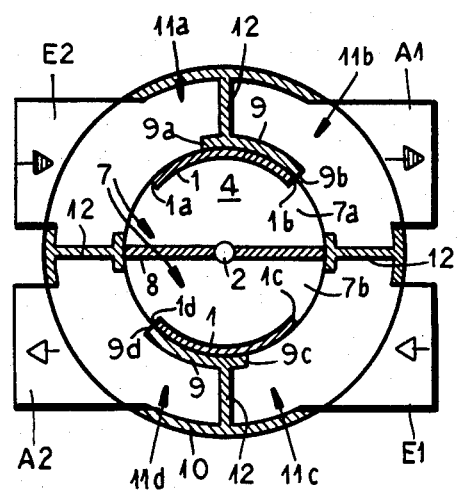
FIG. 4 is a diagrammatic section taken along the laine B—B of FIG. 3 in the normal position of the valve member.
Figure 5:
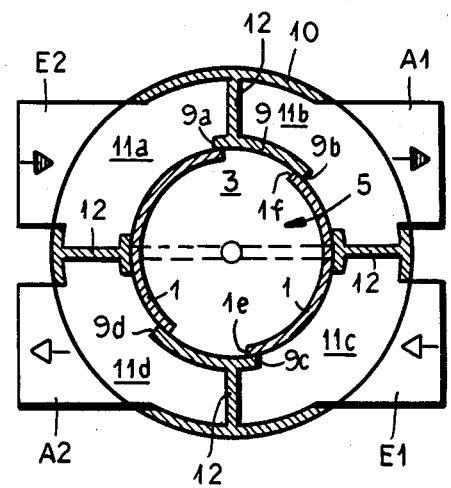
FIG. 5 is a diagrammatic section taken along the line A—A of FIG. 3 in the normal position of the valve member.

In the middle chamber 7, partition wall 8 is fastened so as to extend through the axis of rotation 2 and, in the normal position illustrated in FIGS. 1, 4 and 5, is parallel to the two directions of flow. The valve member 1 is mounted within an inner fixed cylinder 9, the inside diameter of which is only slightly greater than the outside diameter of the valve member 1 and which is surrounded coaxially by an outer fixed cylinder 10 forming with the cylinder 9 an annular space 11 which is divided up into four sectors of equal size by radial partition walls 12 lying in two coplanar pairs at right angles to one another. A connection fitting is fastened to each of these four sector-shaped part annular spaces $11a$, $11b$, $11c$, $11d$ which each subtend an angle of 90 degrees, an inlet $E_1$ and, parallel to it, an outlet $A_1$ being connected on a first side, and a first conduit $E_2$ and outlet $A_2$ being connected on an opposite second side of the device. The utlet and first conduit $A_1$, $E_2$ and inlet and second conduit $E_1$, $A_2$ are in line with one another.

Figure 6:
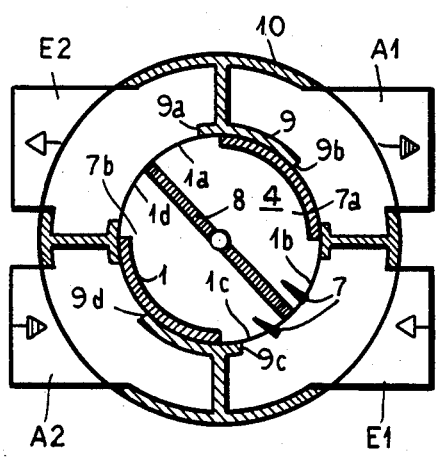
FIG. 6 is a diagrammatic section taken along the line B—B of FIG. 3 in the deflected position of the valve member.
Figure 7:
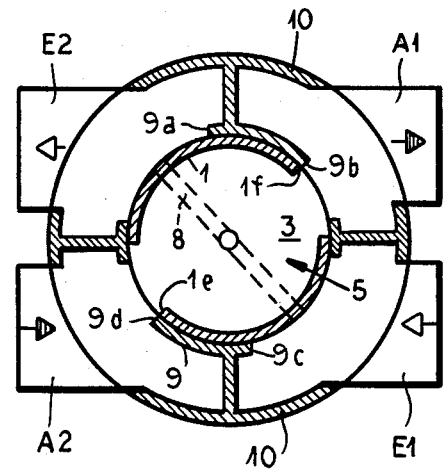
FIG. 7 is a diagrammatic section taken along the line A—A of FIG. 3 the deflected position of the valve member.

The inner fixed cylinder 9 has, for each of the all three chambers of the valve member, four orifices $9a$, $9b$, $9c$, $9d$ which connect the interiors of chambers 5, 6 and 7 of valve member 1 to the sectors $11a$ to $11d$ respectively (FIG. 6). These orifices $9a$ to $9d$ are controlled by the valve member 1, which in its cylindrical wall has orifices $1a$ to $1f$ of which the orifices $1a$–$1d$ are arranged at the level of the middle chamber 7 and the orifices $1e$ and $1f$ are arranged respectively at the levels of the outer chambers 5 and 6. In the normal position illustrated in FIGS. 1, 4 and 5, the outer chamber 5 and outer chamber 6 are closed by means of the valve member 1 (FIG. 5) and the middle chamber 7 is opened, the middle chamber being divided into two half chambers $7a$, $7b$ by the partition wall 8 which connects the inlet $E_1$ to the conduit $A_2$ now acting as an outlet by means of the first half chamber $7b$ and the conduit $E_2$ now acting as an inlet to the outlet $A_1$ by means of the second half chamber $7a$, so that the two streams of fluid or water flow past one another and parallel to one another.

When the inlet $E_1$ is to be connected to th conduit $E_2$ and the conduit $A_2$ to the outlet $A_1$, usually only for a short time, so that the streams intersect, the valve member 1 is rotated 45 degrees by means of an actuating drive, with the result that the sector $11a$ and the sector $11c$ are connected to one another via the two half chambers $7a$, $7b$ and the fluid therefore flows from the inlet $E_1$ through the middle chamber 7 to the conduit $E_2$ now acting as an outlet. In this rotated position of valve member 1, the other two outer chambers 5, 6 are also utilized, since their orifices $1e$, $1f$ are opened by the valve member 1 and the inner spaces of the outer chambers 5, 6 are consequently connected to the sectors $11a$ and $11d$. Thus, one half of the fluid return stream flows from $A_2$ to $A_1$ via the outer chamber 5 and the second half via the outer chamber 6 and intersects the patter of the forward stream flowing through the middle chamber 7, which is equal to the sum of the flow through chambers 5 and 6.

Connected to the conduit $E_2$ and the conduit $A_2$ is a heat exchanger 13, in the condenser tubes 14 of which freely movable cleaning brushes (not shown) are moved to and fro by the fluid stream, especially by the water stream, and stop their movement in catching sleeves 15 located at the ends of the condenser tubes. When the flow through the heat exchanger is briefly reversed, the flow in the condenser tubes is reversed, and consequently the brushes located in the condenser tubes are moved through over the entire length of the tubes and are moved back again after the slide valve 1 has been reset, as a result of which deposits in the tubes are removed. In normal cases, the nominal width of the connection fittings is 50–700 mm and the diameter of the housing (outer cylinder) is 400–2,400 mm.

We claim:

1. A rotary slide valve comprising:
    a generally hollow cylindrical rotary valve member having closed ends and centered on an axis;
    an inner fixed cylinder slidably receiving said valve member and coaxial therewith;
    an outer fixed cylinder spaced outwardly from said inner fixed cylinder, having a larger diameter than said inner cylinder and coaxial therewith and with said valve member;
    two pairs of coplanar webs interconnecting said cylinders, the webs of one of said pairs lying at a right angle to the webs of the other pair whereby said webs define between said cylinders four arcuate sectors at respective quadrants around said axis;
    an inlet fitting and an outlet fitting generally parallel with one another at one side of said outer cylinder and connected thereto in communication with respective ones of said sectors at said one side;
    a first conduit and a second conduit generally parallel with one another at an opposite side of said outer cylinder and connected thereto in communication respectively with the others of said sectors at said opposite side,
    said first conduit being in axial alignment with said outlet fitting and said second conduit being in axial alignment with said inlet fitting,
    said first conduit being in communication with its respective sector at a location diametrically and diagonally opposite the connection of said inlet fitting with its respective sector and said outlet fitting communicating with its respective sector diametrically and diagonally opposite the connection between said second conduit with its respective sector, said inner cylinder being formed with a respective opening communicating with each of said sectors;

a first passageway formed in said valve member centrally of the ends thereof and provided with a first pair of openings communicating with diametrically opposite sectors in a first angular position of said valve member; and a partition formed in an axial plane of said valve member at least in said first passageway dividing the interior thereof into two compartments bounded by said partition, said partition dividing said first pair of openings into respective apertures opening in pairs into said compartments and communicating with each of said sectors in a second angular position of said valve member wherein said partition lies substantially between said sides of said outer cylinder and parallel to said conduits and fittings, whereby said first conduit and said outlet fitting are interconnected by one of said compartments and said second conduit and said inlet fitting are connected by the other of said compartments, said valve member being provided with two additional second passageways flanking said first passageway and having diametrically opposite second apertures formed thereon whereby rotation of said member from said second position into said first position angularly offset from said second position will effect communication through said second passageways to two diagonally opposite sectors while communication between two other diagonally opposite sectors is effected simultaneously through both of said compartments of said first passageway so that said first conduit and said inlet fitting are interconnected and said second conduit and outlet fitting are interconnected.

2. The rotary slide valve defined in claim 1 wherein the hollow interior of said valve member is divided axially into three chambers forming respectively said first passageway and said pair of second passageways including a first chamber forming said first passage way formed with said partition and said compartments and two outer chambers flanking said first chamber and each forming a respective one of said second passageways between said respective diametrically opposite second apertures, the flow cross section of each of said outer chambers being substantially equal to one another and together to the flow cross section of said first chamber, a medium flowing through said rotary slide valve passing through all three chambers in said first position of said valve member and only through said first chamber in said second position of said member.

* * * * *